Nov. 25, 1930.  F. OUDIN ET AL  1,782,440
CLAMPING DEVICE
Filed April 30, 1929   2 Sheets-Sheet 1

Inventors
Ferdinand Oudin &
Benjamin H. Skinner
By [signature] Atty.

Nov. 25, 1930.    F. OUDIN ET AL    1,782,440
CLAMPING DEVICE
Filed April 30, 1929    2 Sheets-Sheet 2
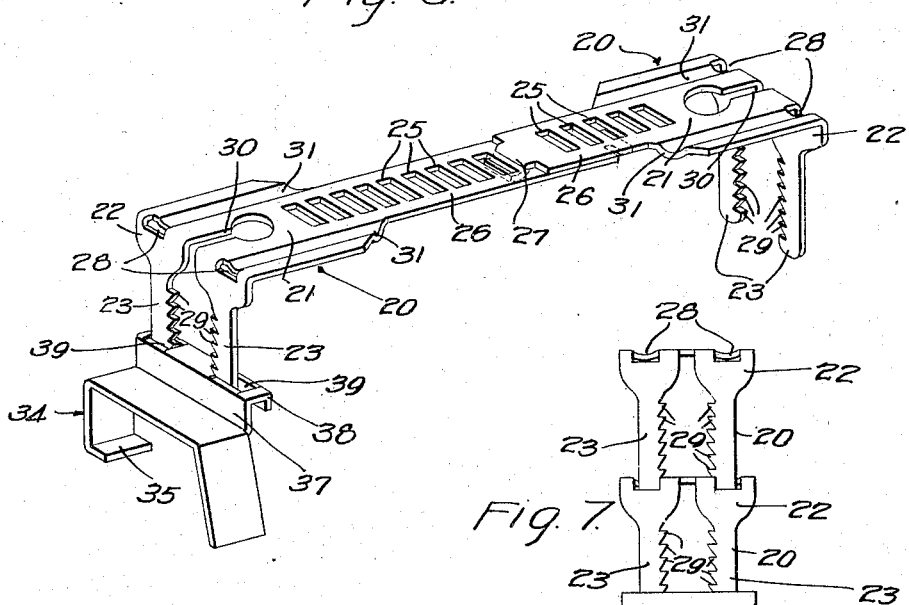
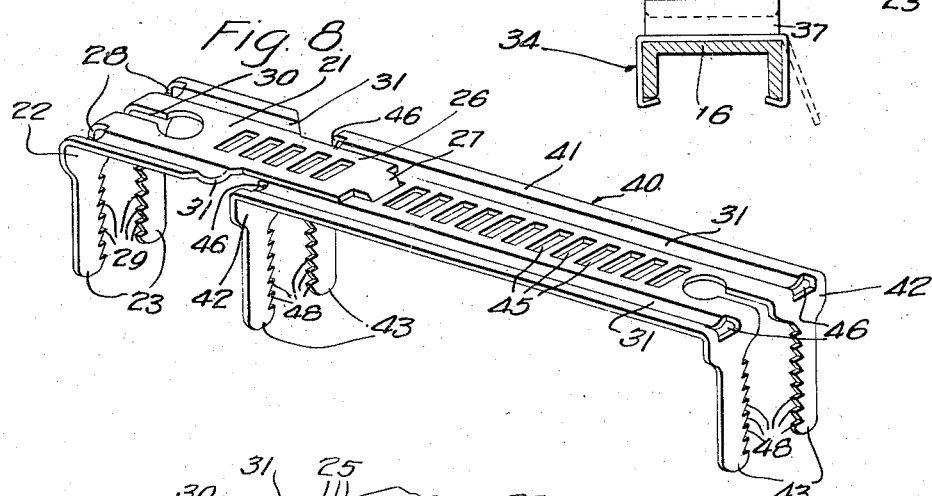
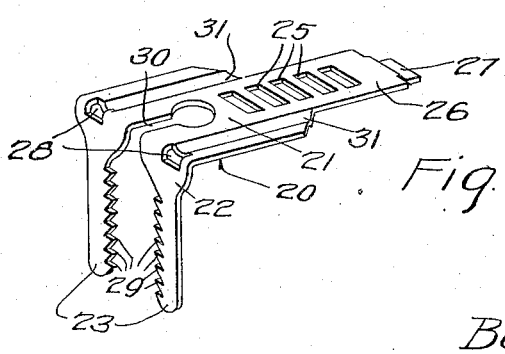
Inventors
Ferdinand Oudin &
Benjamin H. Skinner,
By N. A. Pattison Att'y Patented Nov. 25, 1930

1,782,440

UNITED STATES PATENT OFFICE

FERDINAND OUDIN, OF RIVERSIDE, AND BENJAMIN HARVEY SKINNER, OF BERWYN, ILLINOIS, ASSIGNORS TO WESTERN ELECTRIC COMPANY, INCORPORATED, OF NEW YORK, N. Y., A CORPORATION OF NEW YORK

CLAMPING DEVICE

Application filed April 30, 1929. Serial No. 359,343.

This invention relates to clamping devices, and more particularly to devices for fastening strands or cables to supports and to each other.

The invention has for its principal object the provision of improved and readily adjustable clamping devices of simple and economical construction for attaching strands or cables to a supporting framework and to each other.

In accordance with the above object, the invention contemplates the provision of an improved cable clamping device consisting of flat metal strip material formed into a two sided right angle member for cooperating with a similar member to enclose a group of cables. The top or horizontal portion is provided with a plurality of transverse slots and terminates in a reduced portion having an offset lip for selectively engaging the transverse slots in another similar member to provide horizontal adjustment. The vertical portions of the cooperating members are provided with bifurcated ends having internal edge teeth for selective engagement by the edges of transverse slots in a previously installed clamping device to secure vertical adjustment. A similar three sided member may be employed for starting the attachment of the cables to the supporting framework.

Figure 1:
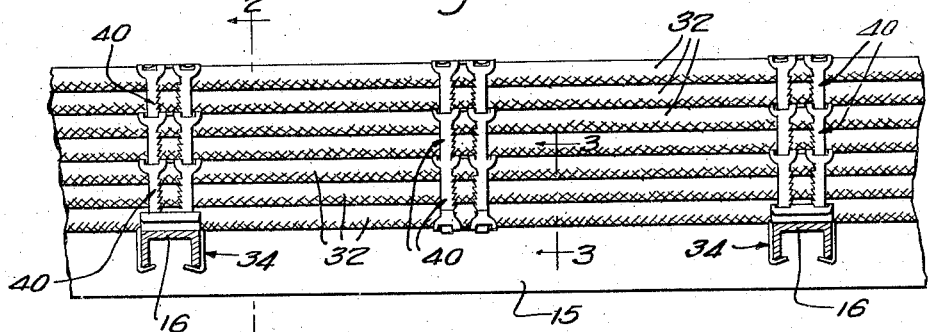
Figure 2:
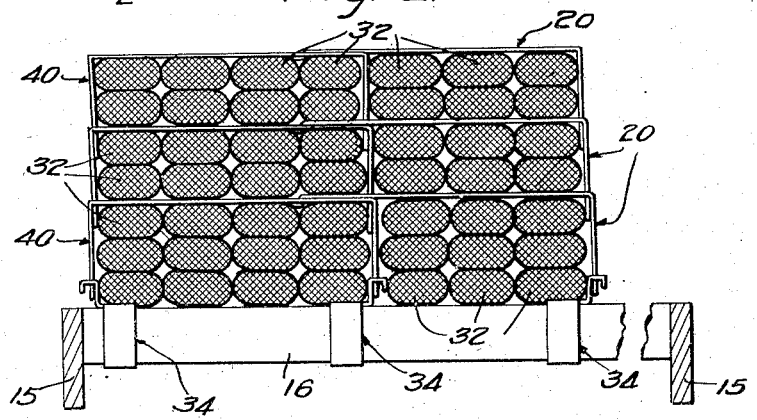
Figure 3:
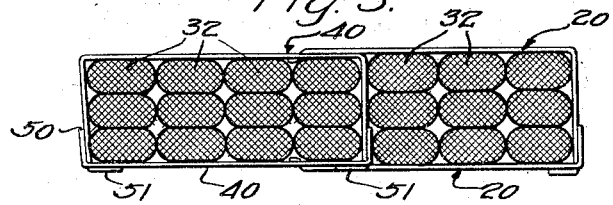
Figure 4:
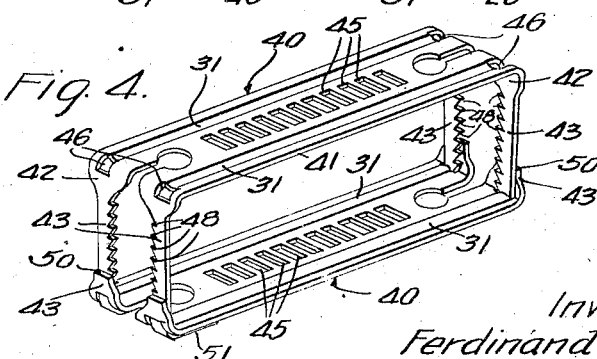

A more complete understanding of the invention will be had from the following detailed description, reference being had to the accompanying drawings, wherein Fig. 1 is a fragmentary side elevational view, partly in section, of a group of cables shown attached to a supporting framework and to each other by means of clamping devices embodying the features of the invention, Fig. 2 is an enlarged transverse section taken on line 2—2 of Fig. 1, Fig. 3 is an enlarged fragmentary section taken on line 3—3 of Fig. 1, showing a plurality of cables clamped together by means of the improved clamping devices, Fig. 4 is an enlarged perspective view of the clamping devices shown in Fig. 3, Fig. 5 is an enlarged perspective view of a two sided clamping device embodying the invention, Fig. 6 is an enlarged perspective view of a pair of interlocked two sided clamping devices shown attached to a base clamp, Fig. 7 is an end elevational view of a pair of clamping devices shown attached to each other and to a base clamp secured to a channel support, and Fig. 8 is an enlarged perspective view of a three sided clamping device embodying the invention with a two sided clamping device interlocked therewith.

Clamping devices embodying the features of the invention may be employed to advantage in telephone exchanges for attaching the cables of electrical conductors interconnecting the electrical apparatus, to a supporting framework. As shown in Figs. 1 and 2, the cable supporting framework may consist of a pair of spaced parallel bars or stringers 15 interconnected by a plurality of spaced cross-straps 16, preferably formed of channel iron. The cables are usually attached to the framework with their axes parallel to the stringers 15 and at right angles to the channels 16. It will be observed that the clamping devices supporting the first few layers of cables are attached to suitable base members or clamps secured at predetermined positions along the cross-straps 16. Additional layers of cables are fastened to the preceding layers by means of cooperating clamping devices which are attached to the devices supporting the preceding layers.

In its preferred form, the improved clamping device consists of flat strip material, preferably resilient sheet metal, formed into a two sided right angle member 20 (Fig. 5) adapted to cooperate with a similar member to provide a U-shaped enclosure (Figs. 6 and 8) for a group of cables and formed with means for attaching the enclosed cables to a supporting framework or to a previously supported group of cables. Each of the members 20 comprises a horizontal portion 21 connected at one end to a bifurcated vertical portion 22 having reduced extremities or legs 23, 23. The horizontal portion 21 is provided with a plurality of spaced transverse slots 25, 25 and terminates in a reduced portion 26 having an offset lip 27 for selective interlocking engagement with the transverse slots 25 of a cooperating similar device to provide horizontal adjustment for accommodating various numbers and sizes of cables. Spaced transverse slots 28, 28 are provided at the end of the horizontal portion adjoining the vertical portion for accommodating the vertical legs 23 of a cooperating similar device. The legs 23 are provided on their inside edges with a series of projections or teeth 29 for selective engagement by the edges of the transverse slots 28 in the horizontal portion of a cooperating similar device to provide vertical adjustment for accommodating various numbers and sizes of cables. This vertical adjustability also provides a simple and efficient means for accommodating slight variations in the dimensions of similar types or sizes of cables, such as may be caused by slight variations in the sizes of the composite conductors or by other variations encountered in commercial manufacturing conditions. Furthermore, the clamping devices automatically adjust themselves to dimensional variations of the cables resulting from the compressing force of superimposed layers of cables.

The horizontal portion 21 is longitudinally slotted, as indicated at 30, for the purpose of lending flexibility to the vertical legs 23. It will be observed, also, that the horizontal portion is provided with longitudinally extending depressed beads or ribs 31, 31 which become embedded in the cables when the device is clamped in position, thereby preventing longitudinal displacement of the cables. The ribs 31 also serve to stiffen the horizontal portion of the clamping device.

When employing the clamping devices 20 for attaching a run or group of cables 32 (Fig. 1) to a supporting framework, the clamping devices enclosing the first layers of cables are attached to suitable base clamps adapted to be secured to the framework, as hereinbefore described. As shown in Figs. 1 and 2, the clamping devices 20 enclosing the first three layers of cables 32 are attached to base clamps 34, 34 secured to the cross channels 16. The base clamp 34 may consist of flat strip material, preferably sheet metal, formed into a three sided loop for engaging the web and sides of the channel and having one end thereof bent inwardly, as indicated at 35, for engaging the lower edge of a flange or side of the channel. The other side of the loop normally extends straight outwardly, as shown in dotted outline in Fig. 7, and is adapted to be bent inwardly and around the lower edge of the opposite side or flange of the channel. The top or horizontal portion of the base clamp 34 is formed with an upwardly extending portion 37 terminating in an inverted U-shaped channel portion 38 having spaced slots 39, 39 for accommodating the vertical legs 23 of a clamping device 20. The inner edges of the slots 39 are adapted to selectively engage the edge teeth 29 of the vertical legs 23 to provide vertical adjustment for accommodating various numbers and sizes of cables.

A three sided or substantially U-shaped member 40 (Fig. 8), similar to the member 20, may be provided for attaching the first group of cables to the supporting framework. The member 40 comprises a flat horizontal portion 41 interconnecting a pair of bifurcated vertical end portions 42, 42 which terminate in reduced extremities 43, 43. The horizontal portion 41 is provided with a plurality of spaced transverse slots 45, 45 for selective interlocking engagement by the horizontal portion of a two sided member 20, as shown in Fig. 8, to provide horizontal adjustment for accommodating various numbers and sizes of cables. Spaced transverse slots 46, 46 are provided at the ends of the horizontal portion 41 for accommodating the reduced vertical extremities of cooperating members enclosing additional cables or groups of cables. The reduced extremities 43 are provided on their inside edges with a series of spaced projections or teeth 48, 48 for selective engagement by a cooperating similar device or base member to provide vertical adjustment for accommodating various numbers and sizes of cables.

When employing the improved clamping devices for attaching a run or group of cables 32 to a supporting framework, a pair of base clamps 34 are first clamped at predetermined positions along each or certain of the cross channels 16 and the cables are then arranged in horizontal layers along the cross channels in the spaces defined by the base clamps. U-shaped clamping members 40 are then placed around the cables and are pressed downward to firmly clamp the cables to the channels 16, the toothed extremities 43 of the clamping devices extending into the slots 39 of the base clamps and automatically becoming interlocked therein, as hereinbefore described. If desired two sided clamping members 20, interlocked as shown in Fig. 6, may be employed in place of the U-shaped clamping members 40 for attaching the first group of cables to the supporting framework. In this manner, horizontal as well as vertical adjustment is obtained for accommodating various numbers and sizes of cables.

After the first group of cables is securely attached to the supporting framework, various numbers and sizes of additional cables or groups of cables may be readily attached to the framework and to the previously attached cables by means of two sided clamping members 20. In such instances, the horizontal portions 21 of the clamping members 20 are interlocked with the horizontal portions of previously installed clamping members, and the vertical legs 23 thereof are interlocked with base clamps 34, as shown in Fig. 2. Also, when desired, additional layers or groups of cables may be superimposed upon previously installed groups thereof and may be readily and securely attached thereto by means of clamping members 20 and 40 adapted to interlock with previously installed clamping members. It will be noted that the vertical legs of the clamping members 20 and 40 are spaced sufficiently to straddle the reduced horizontal portions 26 of previously installed clamping members 20.

When attaching a plurality of cables to a supporting framework it is sometimes desirable to interlock the cables at positions where it is inconvenient to attach them to the framework. Thus, for example, in the embodiment of the invention illustrated in Fig. 1, it may be desirable to interlock the individual cables or groups of cables at a point intermediate the cross channels 16. This may be readily and conveniently accomplished by means of clamping devices embodying the present invention. As shown in Fig. 3, a plurality of cables 32 are enclosed within a pair of cooperating oppositely disposed clamping members 40, one of which is disposed in an inverted position with its reduced extremities 43 severed therefrom as indicated at 50 (Figs. 3 and 4). The clamping members are then pressed toward each other to securely clamp the enclosed cables to each other, the toothed extremities 43 of the upper clamping member extending into the slots 46 of the lower clamping member and automatically becoming interlocked therein in the manner hereinbefore described. The projecting ends of the reduced extremities 43 of the upper clamping member are bent over the horizontal portion of the lower clamping member as indicated at 51 (Figs. 3 and 4). If desired, additional cables or groups of cables may be attached to a previously supported group thereof by means of cooperating oppositely disposed two sided clamping members 20, interlocked as shown in Fig. 3, and attached to the clamping members enclosing the previously supported group of cables. In this manner, the individual cables or groups of cables may be securely interlocked at positions where it is inconvenient to attach them to the supporting framework.

It is to be understood that the embodiments of the invention herein illustrated and described merely represent several useful forms of the invention, which is capable of numerous other applications within the scope of the appended claims.

What is claimed is:

1. A clamping device comprising a two sided right angle member terminating in portions for adjustable interlocking engagement with cooperating portions of another right angle member.

2. A clamping device comprising a two sided right angle member consisting of a vertical portion and a horizontal portion having a transverse slot and terminating in an offset lip for interlocking engagement with the slot in the horizontal portion of another member, the vertical portion also interlocking with such other member.

3. A cable clamping device comprising a two sided member having one side provided with a plurality of spaced slots and terminating in an offset lip for selective interlocking engagement with the slots in a similar line of another member to provide an adjustable enclosure and another side also for locking engagement with the member.

4. A cable clamping device consisting of flat strip material formed into a two sided member for partially enclosing a plurality of cables and having means for adjustable interlocking engagement of both sides thereof with another member.

5. A cable clamping device having a substantially flat cable engaging portion formed with means for attachment to another member and provided with a transverse slot and terminating in an offset lip for interlocking engagement with the transverse slot of such other member.

6. A cable clamping device having a substantially flat cable engaging portion provided with means for attachment to another member and a plurality of spaced transverse slots and terminating in an offset lip for selective interlocking engagement with the transverse slots of such other member to provide horizontal adjustment.

7. A cable clamping device consisting of flat strip material formed into a two sided member having a portion formed with a depressed rib for engaging a cable and terminating in a portion formed with means for adjustable interlocking engagement with another member.

8. A cable clamping device consisting of flat strip material formed into a two sided right angle member comprising a horizontal portion and a vertical portion, the horizontal portion having a plurality of spaced transverse slots and terminating in an offset lip for adjustable interlocking engagement with the transverse slots of another member to provide an adjustable enclosure for accommodating various numbers and sizes of cables.

9. A cable clamping device consisting of flat strip material formed into a two sided right angle member comprising a horizontal portion and a vertical portion, the horizontal portion having a plurality of spaced transverse slots terminating in an offset lip for selective interlocking engagement with the transverse slots of a second member to provide horizontal adjustment, and the vertical portion being formed with means for adjustable interlocking engagement with a third member to provide vertical adjustment.

10. A cable clamping device consisting of flat strip material formed into a two sided right angle member comprising a horizontal portion and a bifurcated vertical portion terminating in reduced extremities having a plurality of spaced projections, the horizontal portion having slots for accommodating the reduced extremities of a second member in such manner that the edges of the slots in the first member selectively engage the projections on the reduced extremities of the second member to provide vertical adjustment, and the horizontal portion having a reduced end portion provided with a plurality of spaced transverse slots and terminating in an offset lip for selective interlocking engagement with the transverse slots of a third member to provide horizontal adjustment.

11. A cable clamping device consisting of flat strip material formed into a three sided loop member comprising a horizontal portion interconnecting a pair of bifurcated vertical portions terminating in reduced extremities provided with a plurality of spaced internally projecting edge teeth, the horizontal portion having spaced slots at each end thereof for receiving the reduced extremities of a second member in such manner that the edges of the slots of the first member selectively engage the edge teeth on the reduced extremities of the second member to provide vertical adjustment, and the horizontal portion having a plurality of spaced transverse slots for selective interlocking engagement with another member to provide horizontal adjustment.

In witness whereof, we hereunto subscribe our names this 19th day of April A. D., 1929.

FERDINAND OUDIN.
BENJAMIN HARVEY SKINNER.